US012507777B2

(12) United States Patent
Dooling (10) Patent No.: US 12,507,777 B2
(45) Date of Patent: Dec. 30, 2025

(54) SELECTIVELY SEALABLE EVACUABLE STORAGE BAG AND METHOD OF MAKING AND USING THE SAME (71) Applicant: Load Lugger, LLC, Holly, MI (US)

(72) Inventor: Daniel J Dooling, Fenton, MI (US)

(73) Assignee: LOAD LUGGER LLC, Holly, MI (US)

( * ) Notice: Subject to any disclaimer, the term of this patent is extended or adjusted under 35 U.S.C. 154(b) by 0 days.

(21) Appl. No.: 18/616,013

(22) Filed: Mar. 25, 2024

(65) Prior Publication Data

US 2024/0341431 A1 Oct. 17, 2024

Related U.S. Application Data (63) Continuation of application No. 16/833,658, filed on Mar. 29, 2020, now Pat. No. 11,937,676.
(Continued)

(51) Int. Cl.
A45C 13/00 (2006.01)
A45C 11/00 (2006.01)
(Continued)

(52) U.S. Cl.
CPC ............ A45C 13/008 (2013.01); A45C 11/00 (2013.01); A45C 13/103 (2013.01);
(Continued)

(58) Field of Classification Search
CPC . B65D 81/2023; B65D 81/2038; F41C 33/06; F41C 35/02; A45C 13/008;
(Continued)

(56) References Cited

U.S. PATENT DOCUMENTS 1,020,050 A 3/1912 Padrick
2,872,960 A 2/1959 Kolpin
(Continued)

OTHER PUBLICATIONS

Clear bag for gun google search; google.com; Jun. 27, 2022.
(Continued)

Primary Examiner — Rafael A Ortiz
(74) Attorney, Agent, or Firm — North Star IP Law PLLC; Edmund P. Anderson (57) ABSTRACT A selectively sealable evacuable storage bag comprises a first side comprising a flexible waterproof bag material having a first peripheral shape, a thickness, a first inner surface and a first outer surface; an opposed second side of the bag material comprising a mirror image of the first side in corresponding engagement with the first side; a waterproof weld joining the first side to the second side and defining an opening and a storage chamber extending between them, the opening configured to receive an article; a valve disposed on the first side or the second side, the valve disposed in a conduit attached to respective side and extending from a conduit opening to an outlet opening; and a selectively openable and closable seal disposed proximate the opening and providing a watertight, dust tight, and airtight seal in a closed condition, wherein in the closed condition the storage chamber is evacuable.

20 Claims, 11 Drawing Sheets

Related U.S. Application Data (60) Provisional application No. 62/826,977, filed on Mar. 29, 2019.

(51) Int. Cl.
   *A45C 13/10*    (2006.01)
   *B65D 81/20*    (2006.01)
   *F41A 35/02*    (2006.01)
   *F41C 33/06*    (2006.01)

(52) U.S. Cl.
   CPC ...... *A45C 13/1092* (2013.01); *B65D 81/2023* (2013.01); *F41A 35/02* (2013.01); *F41C 33/06* (2013.01); *A45C 11/001* (2025.01); *A45C 11/002* (2025.01); *A45C 11/003* (2025.01)

(58) Field of Classification Search
   CPC ... A45C 11/00; A45C 13/103; A45C 13/1092; A45C 2011/001; A45C 2011/002; A45C 2011/003
   USPC .......................................... 206/524.8, 811, 3
   See application file for complete search history.

(56) References Cited

U.S. PATENT DOCUMENTS

| | | | |
|---|---|---|---|
| 2,913,030 A | 11/1959 | Fisher | |
| 3,701,371 A | 10/1972 | Stackhouse | |
| 3,865,166 A | 2/1975 | Pedro | |
| 4,257,464 A | 3/1981 | Binney | |
| D262,416 S | 12/1981 | Bianchi | |
| 4,530,178 A | 7/1985 | Rauscher | |
| 4,756,456 A | 7/1988 | Schauer | |
| D351,944 S | 11/1994 | Faichney et al. | |
| D376,474 S | 12/1996 | Marks | |
| D389,643 S | 1/1998 | Stratton | |
| D404,914 S | 2/1999 | Revels | |
| D448,560 S | 10/2001 | Kolpin | |
| D448,561 S | 10/2001 | Kolpin | |
| D487,633 S | 3/2004 | Leary | |
| D520,235 S | 5/2006 | Blaschke | |
| D562,549 S | 2/2008 | Bodnar | |
| D636,180 S | 4/2011 | Sayre | |
| D640,768 S | 6/2011 | Boggan et al. | |
| 8,074,685 B2* | 12/2011 | Calvo | B65D 33/2508 |
| | | | 206/524.8 |
| D652,469 S | 1/2012 | Sayre | |
| D746,586 S | 1/2016 | Tusting | |
| D749,844 S | 2/2016 | Littleton | |
| D784,014 S | 4/2017 | Scranton | |
| D798,593 S | 10/2017 | McCoy | |
| D909,060 S | 2/2021 | Dooling | |
| D990,157 S | 6/2023 | Dooling | |
| 11,937,676 B2 | 3/2024 | Dooling | |
| 2003/0106819 A1 | 6/2003 | Bennett | |
| 2005/0091865 A1* | 5/2005 | Yeager | B65D 33/01 |
| | | | 34/92 |
| 2006/0072857 A1 | 4/2006 | Revels | |
| 2008/0047859 A1* | 2/2008 | Dillard | F41C 33/06 |
| | | | 206/315.11 |
| 2008/0110076 A1 | 5/2008 | Bennett et al. | |
| 2010/0310194 A1 | 12/2010 | Archambault | |
| 2011/0168764 A1 | 7/2011 | Kasiwabara | |
| 2012/0091025 A1 | 4/2012 | Wyner et al. | |
| 2014/0339277 A1 | 11/2014 | Law | |
| 2015/0101285 A1 | 4/2015 | Vonwiller | |
| 2015/0198413 A1* | 7/2015 | Preciat Cervera | F41C 33/06 |
| | | | 206/317 |
| 2015/0297297 A1* | 10/2015 | Kuribayashi | A45D 44/002 |
| | | | 53/434 |
| 2016/0221722 A1* | 8/2016 | Burke | B65B 25/20 |
| 2017/0208924 A1 | 7/2017 | Wu | |
| 2019/0216190 A1* | 7/2019 | Stemp | A45C 13/008 |
| 2021/0093060 A1 | 4/2021 | Dooling | |

OTHER PUBLICATIONS

Clear storage bag for gun google search; google.com;Jun. 27, 2022.
SE Survivor Series Clear Waterproof Rifle Bag; https://www.amazon.com/SE-OD-WB6412R-Survivor-Clear-Waterproof/dp/B0196LACAQ?th=1; Jun. 27, 2022.
Ultimate Arms Gear Waterproof bag; https://amazon.com/Ultimate-Arms_Waterproof-Calibers/dp/B01BB709ZG;Jun. 27, 2022.

* cited by examiner

SELECTIVELY SEALABLE EVACUABLE STORAGE BAG AND METHOD OF MAKING AND USING THE SAME

REFERENCE TO RELATED APPLICATIONS

This patent application claims priority to U.S. Non-Provisional patent application Ser. No. 16/833,658, filed Mar. 29, 2020, which claims priority to U.S. Provisional Patent Application Ser. No. 62/826,977, filed Mar. 29, 2019, both of which are incorporated herein by reference in their entirety.

FIELD OF THE INVENTION

The subject invention relates generally to a selectively evacuable storage bag, and more particularly to a selectively evacuable waterproof and dustproof gun storage bag or electronic device storage bag.

BACKGROUND OF THE INVENTION

There are many forms of waterproof storage containers that are designed and used for a wide variety of items and purposes. One limitation common to many articles and water-resistant and waterproof storage containers designed for them is that it is generally the case that the articles may not be used for their intended purpose, either in whole or in part, while in the waterproof container because operation of the article requires tactile contact and/or manipulation from a human user that is not possible in the container. This often occurs because the waterproof storage container is a general design (e.g. a hard or soft case) that makes no attempt to provide tactile contact and/or manipulation of the article and its features by a human user, or because the material used to form the waterproof storage container does not allow sufficient tactile contact with the item being stored for its operation. In other cases, it may be possible to provide sufficient tactile contact for operation of the item by designing and manufacturing a container specifically for the items and their operable features, but this is frequently costly and time consuming such that it is not economically viable. Therefore, many items do not have a waterproof container that enables storage and use of the item while in the container, particularly while the item and container are exposed to or immersed in water.

A similar problem exists with regard to exposure to dust and/or dirt and/or other foreign matter, whether in the form of liquids, gases, particulates, or other forms of foreign matter. Many items do not have a waterproof and dustproof container that enables storage and use of the item while in the container, particularly while the item and container are exposed to or immersed in other liquids, gases, particulates or other forms of foreign matter.

One category of items lacking waterproof and/or dustproof storage containers that allow use while in the containers are various types of firearms. There are currently no waterproof and/or dustproof containers that enable effective waterproof and/or dustproof storage and use of various types of firearms.

Another category of items lacking waterproof and/or dustproof storage containers that allow use while in the containers are various types of electronic devices. Some electronic devices have been designed and manufactured to be waterproof, typically to a certain depth, including certain cell phone designs, but are not dustproof. However, there are currently no waterproof and/or dustproof containers that enable effective waterproof and/or dustproof storage and use of various types of electronic devices.

Therefore, a waterproof and/or dustproof storage container that enables waterproof and/or dustproof storage and use of the article being stored during storage is very desirable.

SUMMARY OF THE INVENTION

In one embodiment, a selectively sealable evacuable storage bag is disclosed. The selectively sealable evacuable storage bag comprises: a first side comprising a flexible waterproof bag material having a first peripheral shape, a thickness, a first inner surface and a first outer surface; an opposed second side comprising the flexible waterproof bag material having a second peripheral shape that comprises a mirror image of the first peripheral shape, the thickness, a second inner surface, and a second outer surface, the first peripheral shape and first inner surface in corresponding engagement with the second peripheral shape and second inner surface; a waterproof weld joining a first peripheral portion of the first side to a second peripheral portion of the second side and defining an opening on an open end, a closed end, and a storage chamber extending between them, the opening configured to receive an article within the storage chamber; a selectively actuable valve sealably disposed on the first side or the second side, the selectively actuable valve disposed in a conduit that is sealably attached to the respective first side or second side and extends from a conduit opening in the respective first side or second side to an outlet opening; and a selectively openable and closable seal disposed proximate the opening and configured to enable insertion and extraction of the article in an open condition and a watertight, dust tight, and airtight seal in a closed condition, wherein in the closed condition of the selectively openable and closable seal the storage chamber is evacuable from an unevacuated condition to an evacuated condition by selective removal of a gas through the selectively actuable valve.

In another embodiment, a method of making a selectively sealable evacuable storage bag is disclosed. The method comprises: forming a first side comprising a flexible waterproof bag material having a first peripheral shape, a thickness, a first inner surface and a first outer surface; forming an opposed second side comprising the flexible waterproof bag material having a second peripheral shape that comprises a mirror image of the first peripheral shape, the thickness, a second inner surface, and a second outer surface; forming a conduit opening in one of the first side or second side; placing the first peripheral shape and first inner surface in corresponding engagement with the second peripheral shape and second inner surface; welding the first side to the second side and forming a waterproof weld joining a first peripheral portion of the first side to a second peripheral portion of the second side and defining an opening on an open end, a closed end, and a storage chamber extending between them, the opening configured to receive an article within the storage chamber; disposing a conduit over the conduit opening and welding the conduit sealably to the respective first side or second side, the conduit extending from a conduit opening in the respective first side or second side to an outlet opening; disposing a selectively actuable valve in the conduit so that the selectively actuable valve is sealably disposed on the respective first side or second side; and forming a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve.

In another embodiment, a method of using a selectively sealable evacuable storage bag, comprises: forming a selectively sealable evacuable storage bag, comprising: a first side comprising a flexible waterproof bag material having a first peripheral shape, a thickness, a first inner surface and a first outer surface; an opposed second side comprising the flexible waterproof bag material having a second peripheral shape that comprises a mirror image of the first peripheral shape, the thickness, a second inner surface, and a second outer surface, the first peripheral shape and first inner surface in corresponding engagement with the second peripheral shape and second inner surface; a waterproof weld joining a first peripheral portion of the first side to a second peripheral portion of the second side and defining an opening on an open end, a closed end, and a storage chamber extending between them, the opening configured to receive an article within the storage chamber; a selectively actuable valve sealably disposed on the first side or the second side, the selectively actuable valve disposed in a conduit that is sealably attached to the respective first side or second side and extends from a conduit opening in the respective first side or second side to an outlet opening; and a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve; disposing the article within the storage chamber; closing the selectively openable and closable seal; evacuating the storage chamber to the evacuated condition; wherein the flexible waterproof bag material is configured to conform to the article in the evacuated condition, and wherein the flexible waterproof bag material is selected to provide selective operability of the article and a predetermined member of the article in the non-evacuated condition or the evacuated condition; and operating the article within the storage chamber.

The above features and advantages and other features and advantages of the invention are readily apparent from the following detailed description of the invention when taken in connection with the accompanying drawings.

BRIEF DESCRIPTION OF DRAWINGS

Other features, advantages and details appear, by way of example only, in the following detailed description of embodiments, the detailed description referring to the drawings in which.

DETAILED DESCRIPTION

Waterproof and/or dustproof storage containers that enable waterproof and/or dustproof storage and use of a wide variety of articles that are being stored during storage are disclosed herein. The containers disclosed herein may advantageously be used to store and use any suitable article during storage. In one embodiment, the waterproof and/or dustproof storage containers are configured to enable use of various types of firearms while in the containers. In another embodiment the waterproof and/or dustproof storage containers are configured to enable use of various types of electronic devices while in the containers.

Referring to the Figures, and particularly to FIGS. 1-11, a selectively sealable evacuable storage bag 10 is disclosed. The selectively sealable evacuable storage bag 10 may be provided in any predetermined shape and predetermined size. In certain embodiments, the selectively sealable evacuable storage bag 10 may comprise two sides and a generally flat planar, generally two-dimensional, shape.

The selectively sealable evacuable storage bag 10 comprises a first side 12 comprising a flexible waterproof bag material 14 having a first peripheral shape(s) define by the periphery 16, a thickness (t), a first inner surface 18 and a first outer surface 20.

The selectively sealable evacuable storage bag 10 also comprises an opposed second side 22 comprising the flexible waterproof bag material 14 having a second peripheral shape (s') that comprises a mirror image of the first peripheral shape(s), the thickness (t), a second inner surface 24, and a second outer surface 26, the first peripheral shape(s) and first inner surface 18 in corresponding engagement with the second peripheral shape (s') and second inner surface 24.

The selectively sealable evacuable storage bag 10 also comprises a waterproof weld 27 or joint joining a first peripheral portion 28 of the first side to a second peripheral portion 30 of the second side and defining an opening 32 on an open end 34, an opposed closed end 36, and a storage chamber 38 extending between them, the opening configured to receive an article 40 within the storage chamber. The waterproof weld 27 or joint may be any suitable weld, including all manner of thermal welds, including RF welds, as well as chemical welds formed by a chemical reaction, including all manner of polymerization reactions and reactions associated with the use of glues or adhesives.

The selectively sealable evacuable storage bag 10 also comprises a selectively actuable valve 42 sealably disposed on the first side 12 or the second side 22. The selectively actuable valve 42 is disposed in a conduit 44 that is sealably attached to the respective first side 12 or second side 22 and extends from an inlet opening 45 in the first side 12 or second side 22. The conduit 44 includes a conduit opening 46 disposed proximate the inlet opening in the respective first side or second side to an outlet opening 48.

The selectively sealable evacuable storage bag 10 also comprises a selectively openable and closable seal 50 disposed proximate the opening 32 and configured to enable insertion and extraction of the article 40 in an open condition (FIGS. 2-11) and a watertight and airtight seal 52 in a closed condition (FIG. 1), wherein in the closed condition of the selectively openable and closable seal the storage chamber 38 is evacuable from an unevacuated condition to an evacuated condition by selective removal of a gas through the selectively actuable valve 42.

In one embodiment, the flexible waterproof bag material 14 comprises a polymer film or sheet, which may include any suitable flexible waterproof polymer film or sheet. The bag material 14 of the first side 12 and second side 22 may be the same bag material or different bag materials with regard to the composition of the material, or thickness (t) of the material, or any another characteristic of the material. The bag material 14 comprising a polymer, may also include various reinforcing materials, including various fillers, such as fiber or particulate fillers, or a combination thereof, as well as various fabrics, including woven or unwoven fabrics, such as various polymer fabrics (e.g. polyester, nylon, polypropylene, polyvinyl chloride, and the like)) that are joined (e.g. laminated) to or impregnated within the bag material, or wherein the bag material is added to the fabric as a one-sided or two-sided coating. In one embodiment, the bag material 14 comprises a polymer film or sheet comprising thermoplastic polyurethane (TPU) formed by any suitable method, such as a blown film, and may include TPU comprising an aromatic polyester or an aromatic polyether, with those comprising an aromatic polyether being particularly desirable for applications where water exposure or water immersion of the bag is expected. In one embodiment, the bag material comprises an aromatic polyether TPU marketed as ST-3366 by Schweitzer-Mauduit International, Inc.

The bag material 14 comprising a polymer film or sheet may have any suitable thickness (t). This may include a thickness (t) of 0.5 to 100 mils, more particularly 0.5 to 100 mils, and even more particularly 1.0 to 25 mils, and yet more particularly 1.0 to 15 mils.

Figure 12:
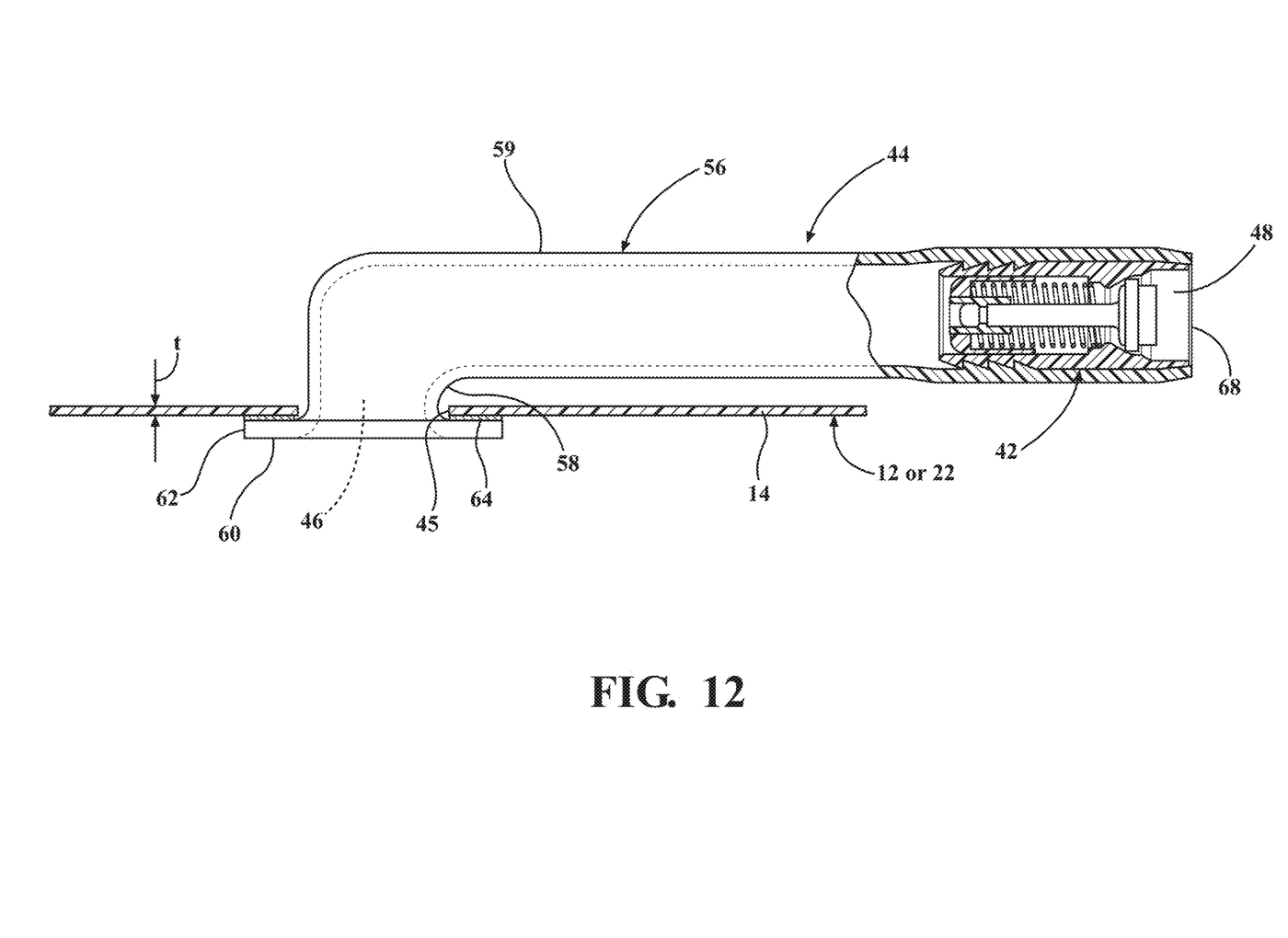
FIG. 12 is a side view of an embodiment of the conduit and valve comprising an L-shaped tube having a valve disposed therein.

As shown in FIG. 12, the conduit 44 may have any suitable shape or size. In one embodiment, the conduit 44 comprises an L-shaped tube 56 comprising a first leg 58 and a second leg 59, an attachment flange 60 disposed on a first end 62 of the first leg that is configured for attachment by a circumferential weld 64 proximate the conduit opening 46 to the respective first side 12 or second side 22, and a selectively sealable cap 66 attached by an attachment member to the second leg 59 and configured to sealably cover the second leg at a second end 68. In one embodiment, the L-shaped tube 56 defines an air passageway on an interior surface and the selectively actuable valve 42 is sealably disposed within the air passageway. In one embodiment, the selectively actuable valve 42 comprises a one-way or check valve configured to extract air from the storage chamber 38. In other embodiments, the selectively actuable valve 42 may comprises a two-way valve that may be used to selectively add air to or remove air from the storage chamber. An embodiment of a selectively actuable valve 42 is described, for example, in U.S. Pat. No. 5,349,984, which is hereby incorporated by reference herein in its entirety. The conduit 44 may be made from any suitable conduit material. In one embodiment the conduit 44 comprises an L-shaped tube 56 and valve 42 configured to remove or evacuate air from the storage chamber formed from polyether TPU available from Halkey-Roberts Corp. St. Petersburg, FL.

Figures 1A, 1B:
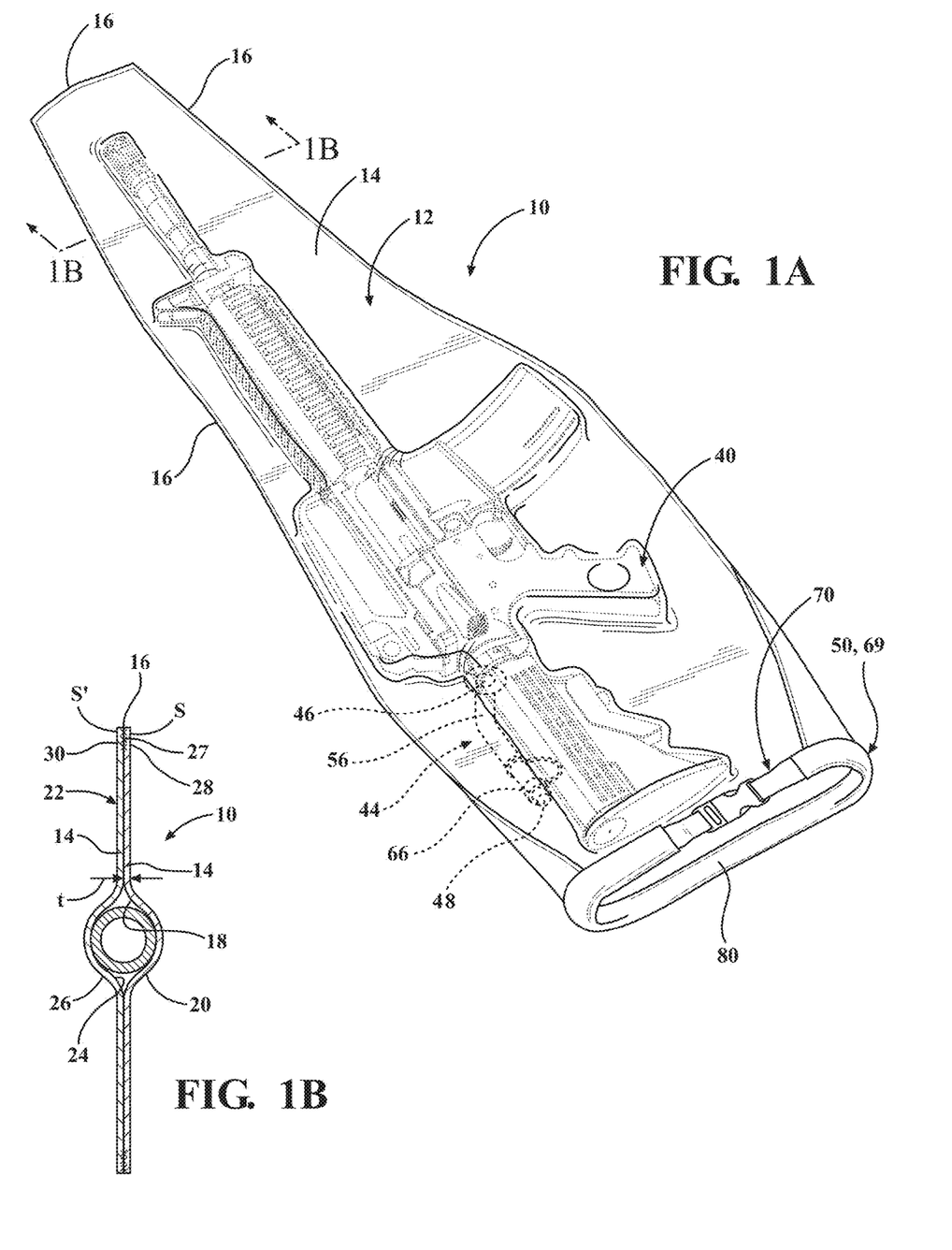
FIG. 1A is a perspective view of an embodiment of a selectively sealable evacuable storage bag, comprising a selectively sealable evacuable firearm storage bag illustrating, in phantom, a semi-automatic rifle disposed therein with the seal and opening in a sealed or closed condition and the storage chamber in a closed, sealed and evacuated condition.
FIG. 1B is a cross-section of the embodiment of FIG. 1A taken along section B-B.
Figure 2:
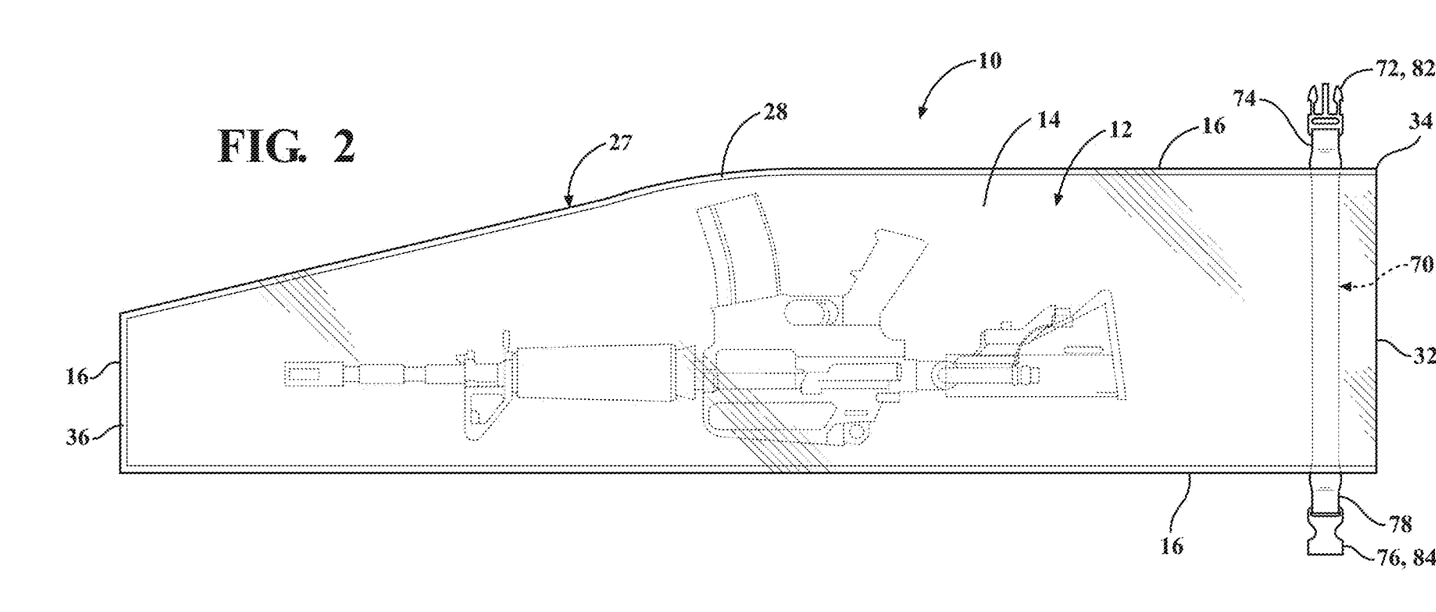
FIG. 2 is a right side view thereof with the seal and opening in an unsealed or open condition and the storage chamber in an open, unsealed, and unevacuated condition.
Figures 3A, 3B:
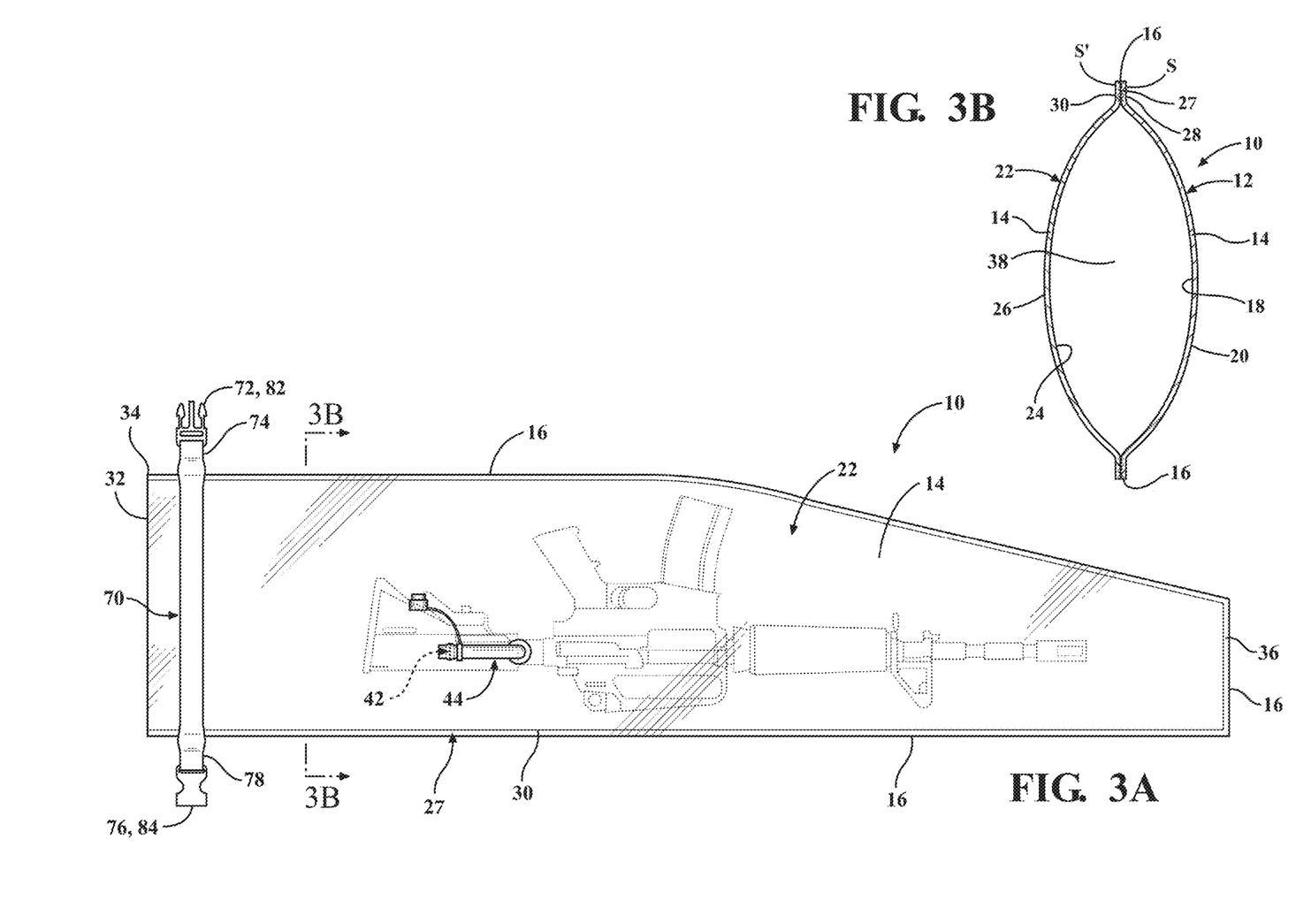
FIG. 3A is a left side view thereof with the seal and opening in an unsealed or open condition and the storage chamber in an open, unsealed, and unevacuated condition.
FIG. 3B is a cross-section of the embodiment of FIG. 3A taken along section B-B.
Figure 4:
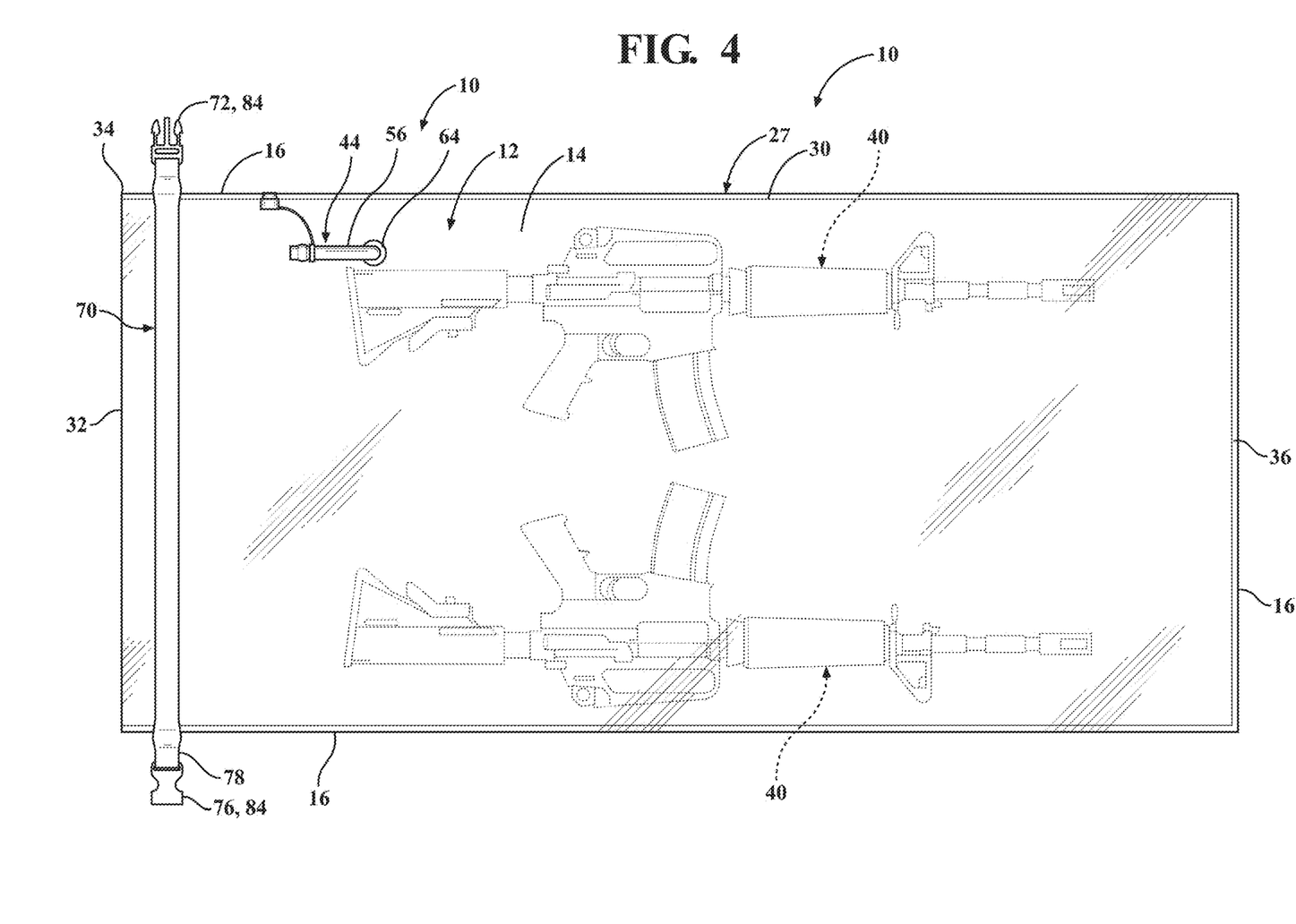
FIG. 4 is a right side view of a second embodiment of a selectively sealable evacuable storage bag, comprising a selectively sealable evacuable firearm storage bag illustrating, in phantom, a plurality of semi-automatic rifles disposed therein with the seal and opening in an unsealed or open condition and the storage chamber in an open, unsealed and unevacuated condition.
Figure 5:
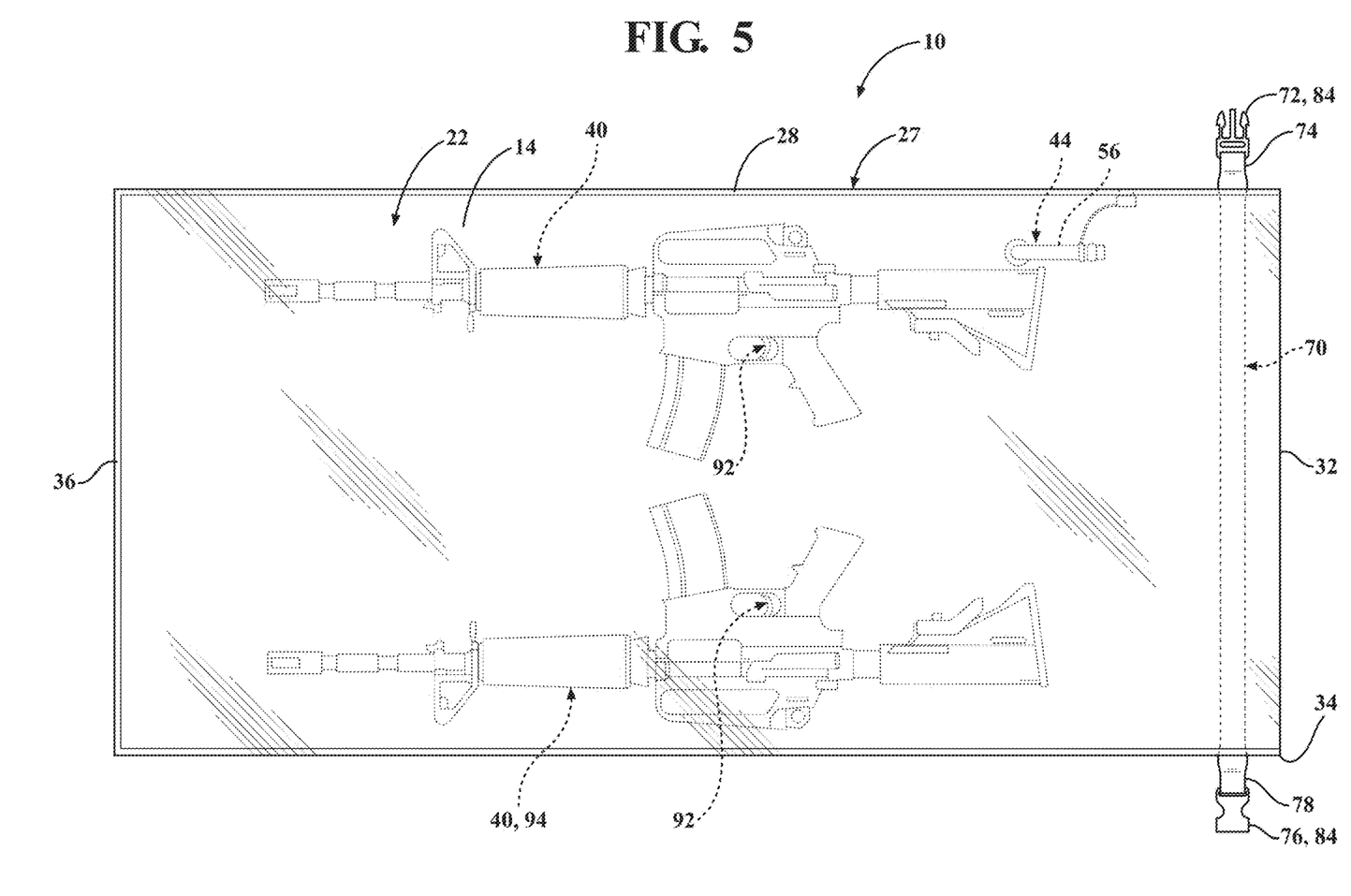
FIG. 5 is a left side view of the second embodiment of FIG. 4 with the seal and opening in an unsealed or open condition and the storage chamber in an open, unsealed and unevacuated condition.
Figure 6:
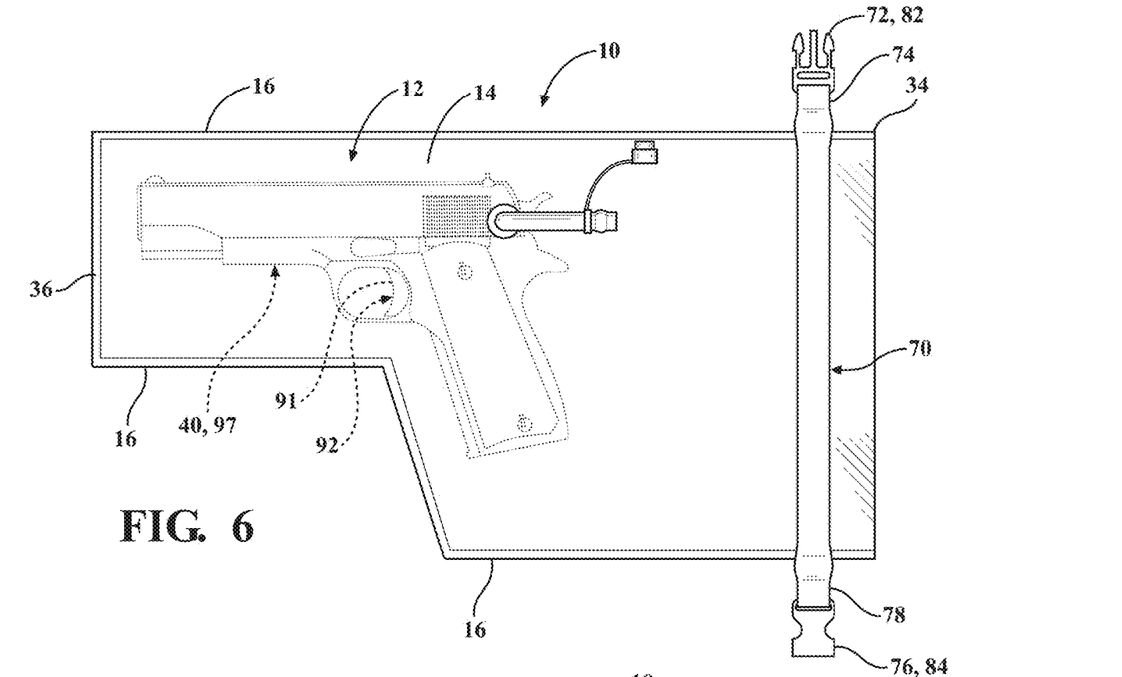
FIG. 6 is a left side view of a third embodiment of a selectively sealable evacuable storage bag, comprising a selectively sealable evacuable firearm storage bag illustrating, in phantom, a semi-automatic pistol disposed therein with an embodiment of a strap seal and opening in an unsealed or open condition and the storage chamber in an open, unsealed and unevacuated condition.

In one embodiment, the selectively sealable evacuable storage bag 10 includes a selectively openable and closable seal 50 that comprises a flexible strap seal 69 comprising a strap 70 disposed on one of the first side 12 or the second side 22, the flexible strap having a first attachment device 72 on one end 74 and a second attachment device 76 on an opposed end 78, the first attachment device and second attachment device configured for selectively locked and unlocked engagement as shown in FIG. 1, the closed condition comprising a plurality of rolls 80 of the strap, first side, and second side toward the closed end and the subsequent locked engagement of the first attachment device and second attachment device. In one embodiment, the first attachment device 72 comprises a male snap buckle 82 and the second attachment device 76 comprises a female snap buckle 84, or vice versa.

Figure 7:
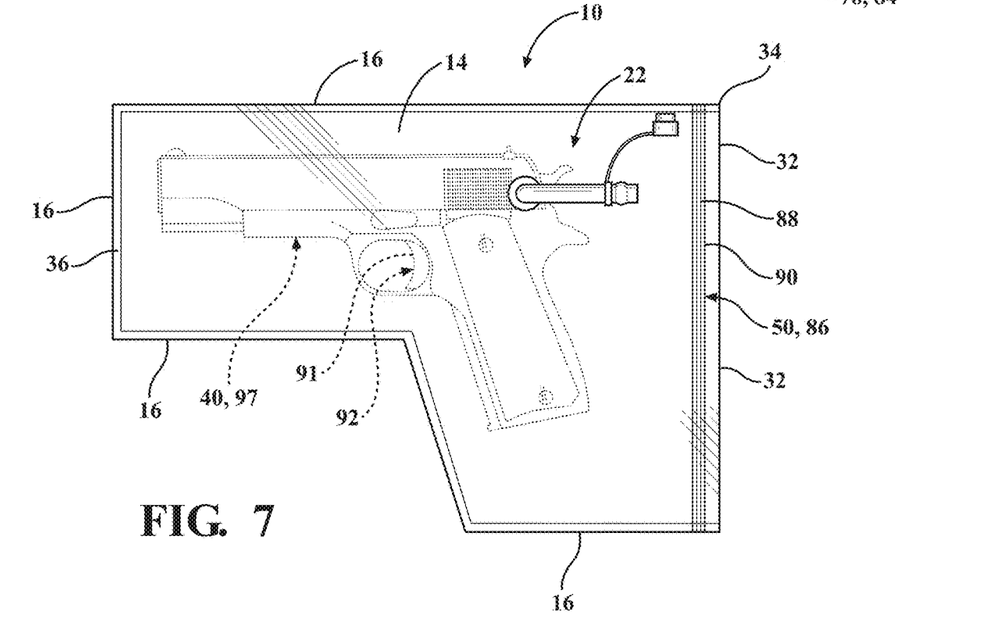
FIG. 7 is a left side view of a fourth embodiment of a selectively sealable evacuable storage bag, comprising a selectively sealable evacuable firearm storage bag illustrating, in phantom, a semi-automatic pistol disposed therein with an embodiment of a zip top seal and opening in an unsealed or open condition and the storage chamber in an open, unsealed and unevacuated condition.
Figure 8:
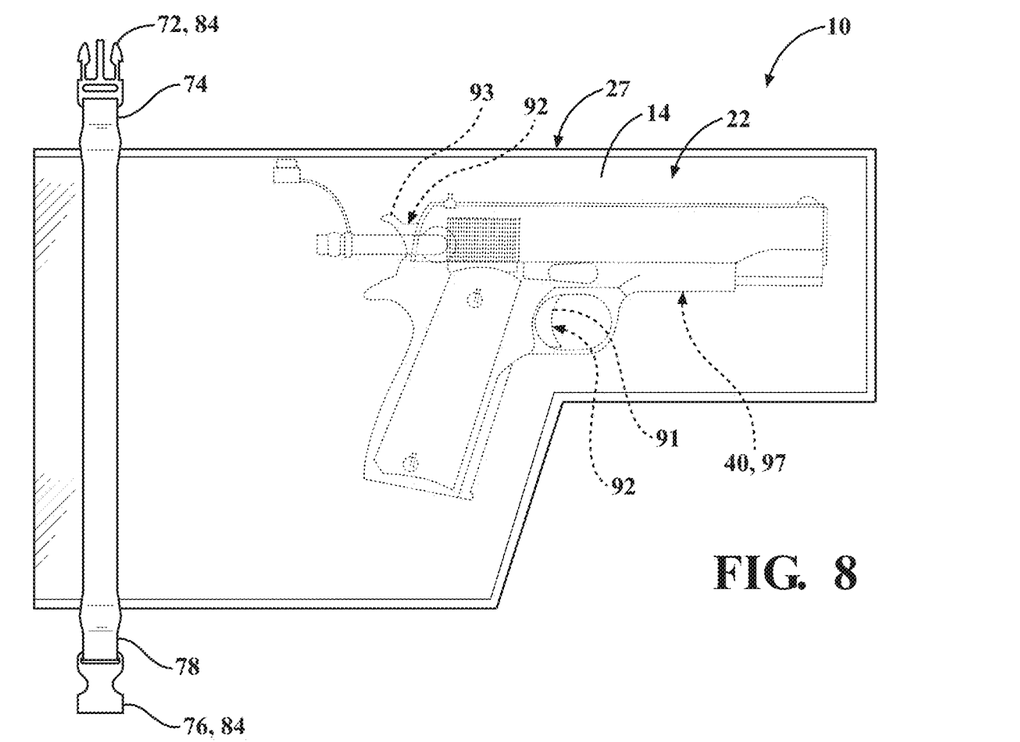
FIG. 8 is a right side view of the third embodiment of FIG. 6 with the seal and opening in an unsealed or open condition and the storage chamber in an open, unsealed and unevacuated condition.
Figure 9:
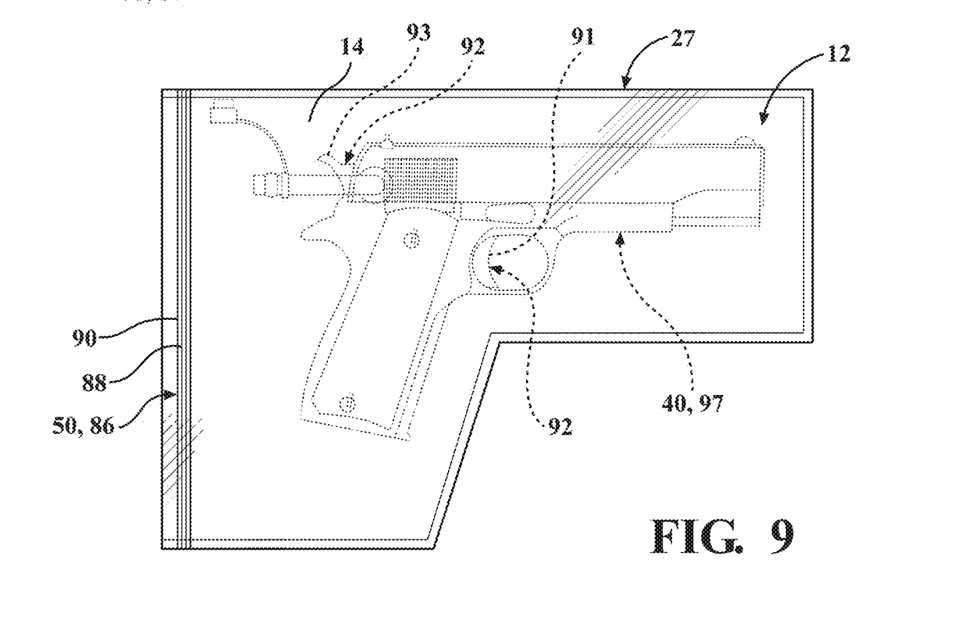
FIG. 9 is a right side view of the fourth embodiment of FIG. 7 with the seal and opening in an unsealed or open condition and the storage chamber in an open, unsealed and unevacuated condition.

In one embodiment, the selectively openable and closable seal 50 comprises a zip top seal 86 comprising a male portion 88 disposed along and proximate the opening 32 on one of the first side 12 and second side 22 and an interlockable female portion 90 disposed along and proximate the opening on the other of the first side and second side. In one embodiment, the zip top seal 86 is configured to provide the closed condition by manual compression of the male portion 88 into the female portion 90 or by zipped engagement provided by a zipper (not shown) for slidably providing the closure pressure along the length of the zip top seal as is known in the art.

In one embodiment, the flexible waterproof bag material 14 is selected and configured to conform to the article 40 in the evacuated condition, and wherein the flexible waterproof bag material is selected to provide selective operability of the article 40 and a predetermined member 92 of the article in the non-evacuated condition or the evacuated condition. Any suitable article 40 may be disposed in the selectively sealable evacuable storage bag 10 where selective operability is desired. The flexibility of the bag material 14 may be selected to provide selective operability of a wide range of predetermined members 92.

In one embodiment, the article 40 comprises a firearm 94, including a pistol 97, revolver, semi-automatic or fully-automatic rifle 99 or gun, bolt action rifle, or shotgun as are well-known in the art. In one embodiment, the firearm 94 includes a predetermined member 92 comprising a trigger 91, a hammer 93, a safety, a decocker, an action, an ammunition clip, an ejector, or another operable member of the firearm, or a combination thereof, as well-known in the art.

In one embodiment, the predetermined member 92 comprises a trigger, and the flexible waterproof material 14 of the first side 12 and second side 22 and a bag shape (s, s') are selected and configured to enable formation of a pocket of the flexible waterproof material bag material within a trigger guard 96 in the unevacuated condition that is retained in the evacuated condition to provide a space for operation of the trigger 91 by a human user. For example, in one mode of use a round may be chambered in the firearm, the safety may be set to a safe position with the hammer cocked, the pocket may be formed in an unevacuated condition, and the storage chamber may be evacuated retaining the pocket in the evacuated condition. In this mode, the firearm 94 may be exposed to all manner of rain, sleet, snow, dust, dirt, or mud, or other contaminants, or a combination thereof, or may be immersed in salt or fresh water, snow, slush, ice, dirt, mud, sand, stones, or the like, or a combination thereof, and retain operational readiness, including the ability for use (e.g. firing), all while it is sealably disposed within the storage chamber without exposure to these elements that would otherwise compromise or prevent the firearm from firing.

Figure 10:
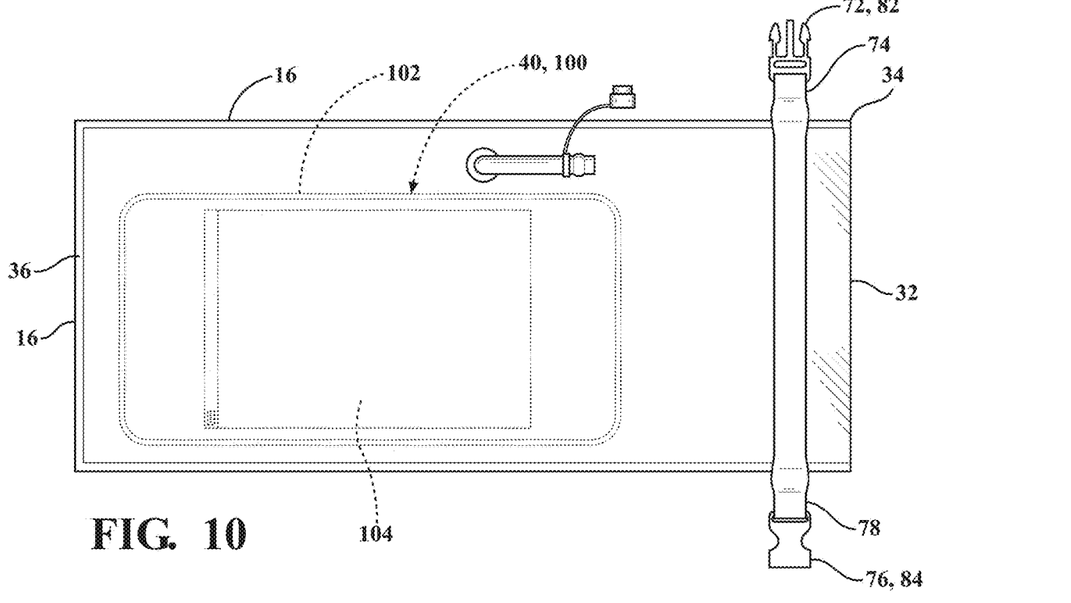
FIG. 10 is a left side view of a fifth embodiment of a selectively sealable evacuable storage bag, comprising a selectively sealable evacuable electronic device storage bag illustrating, in phantom, a smartphone disposed therein with an embodiment of a strap seal and opening in an unsealed or open condition and the storage chamber in an open, unsealed and unevacuated condition.
Figure 11:
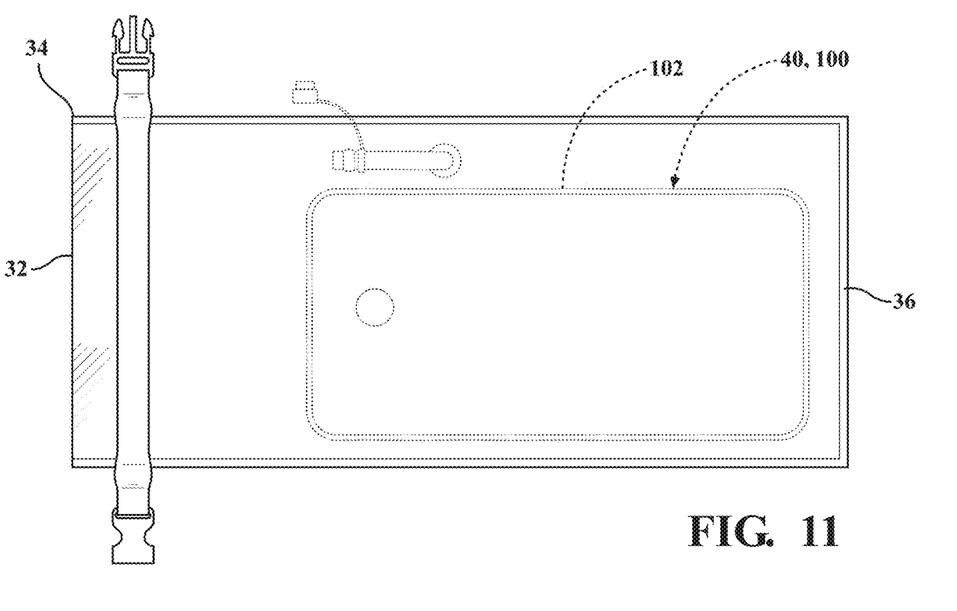
FIG. 11 is a right side view of the fifth embodiment of FIG. 10 with the seal and opening in an unsealed or open condition and the storage chamber in an open, unsealed and unevacuated condition.

In one embodiment, the article 40 comprises an electronic device 100, comprising a cell phone 102, satellite phone, tablet computer, laptop computer, radio, or other electronic device. In one embodiment, the predetermined member 92 comprises a touch screen 104, touch pad, keyboard, or selector switch, or a combination thereof.

Figure 13:
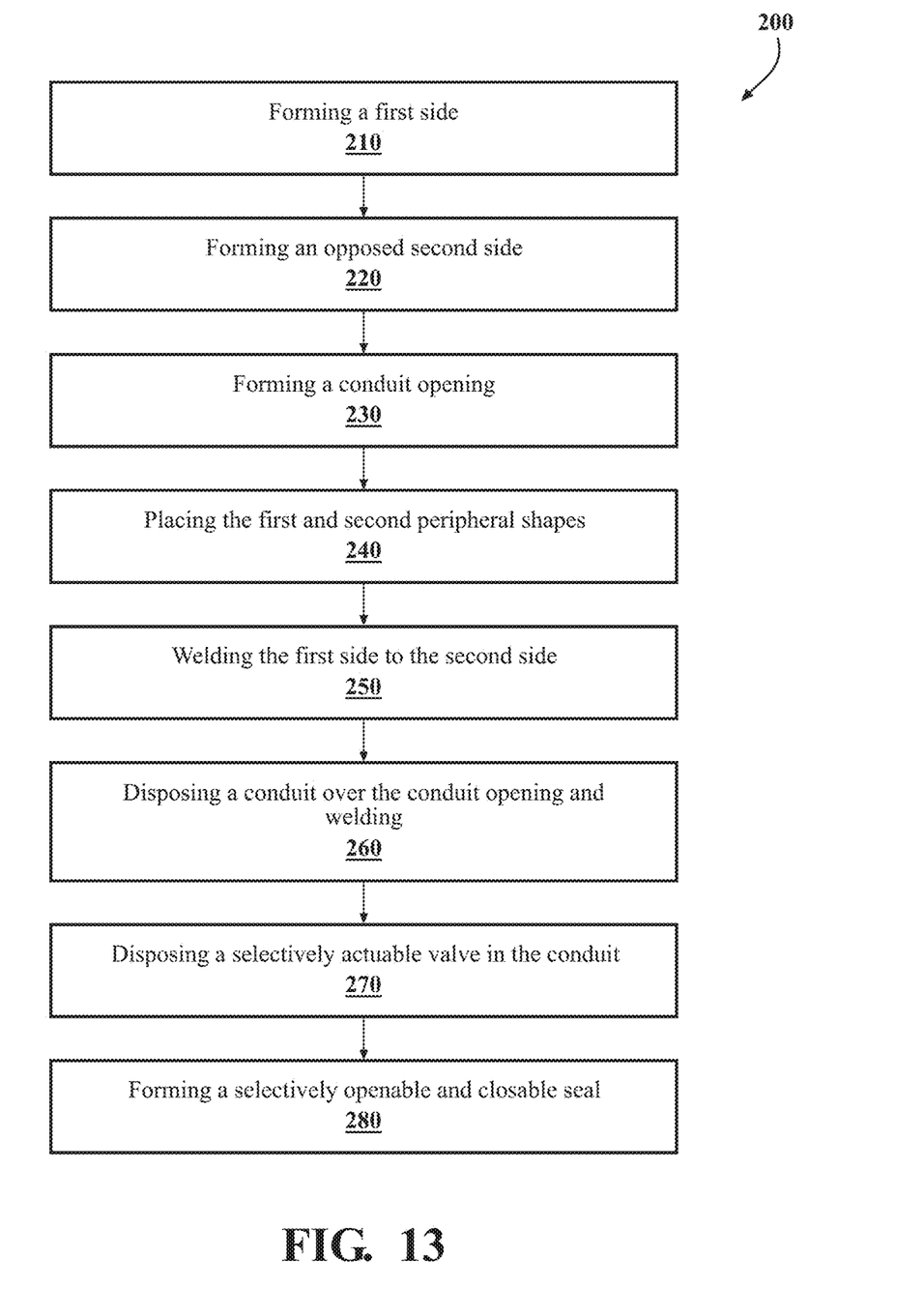
FIG. 13 is a flowchart of a method of making a selectively sealable evacuable storage bag, as described herein.

As illustrated in FIG. 13, in one embodiment, a method 200 of making a selectively sealable evacuable storage bag 10 is disclosed. In one embodiment, the method 200 includes forming 210 a first side comprising a flexible waterproof bag material having a first peripheral shape, a thickness, a first inner surface and a first outer surface; forming 220 an opposed second side comprising the flexible waterproof bag material having a second peripheral shape that comprises a mirror image of the first peripheral shape, the thickness, a second inner surface, and a second outer surface; forming 230 a conduit opening in one of the first side or second side; placing 240 the first peripheral shape and first inner surface in corresponding engagement with the second peripheral shape and second inner surface; welding 250 the first side to the second side and forming a waterproof weld joining a first peripheral portion of the first side to a second peripheral portion of the second side and defining an opening on an open end, a closed end, and a storage chamber extending between them, the opening configured to receive an article within the storage chamber; disposing 260 a conduit over the conduit opening and welding the conduit sealably to the respective first side or second side, the conduit extending from a conduit opening in the respective first side or second side to an outlet opening; disposing 270 a selectively actuable valve in the conduit so that the selectively actuable valve is sealably disposed on the respective first side or second side; and forming 280 a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve.

Figure 14:
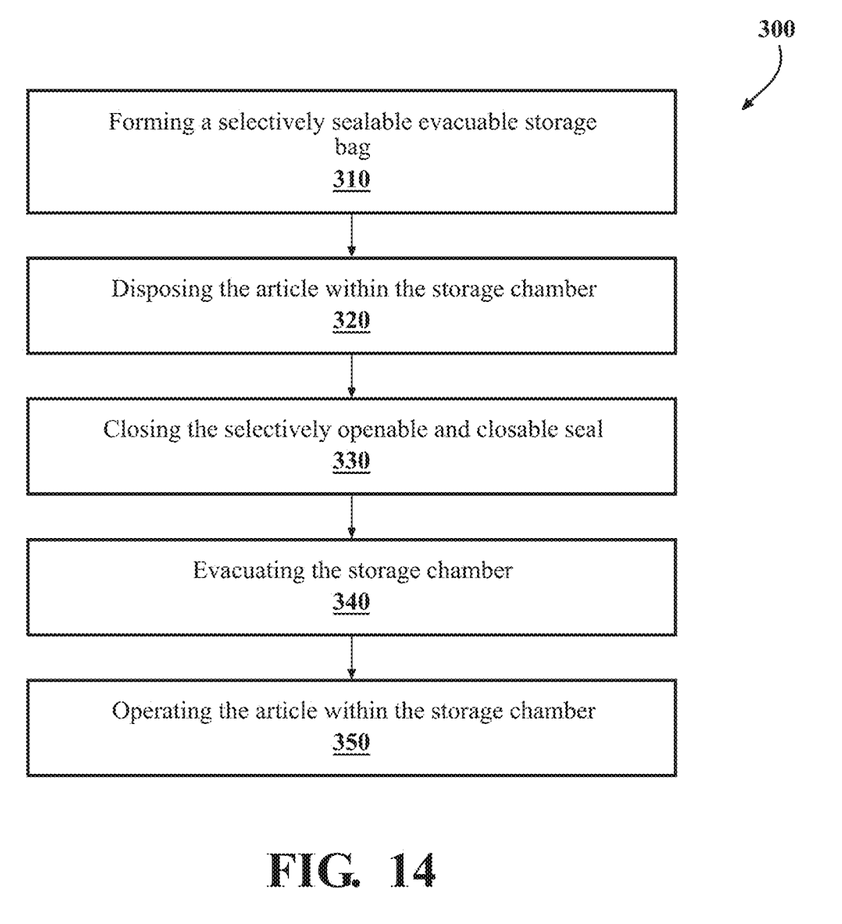
FIG. 14 is a flowchart of a method of using a selectively sealable evacuable storage bag, as described herein.

As illustrated in FIG. 14, in one embodiment, a method 300 of using a selectively sealable evacuable storage bag is disclosed. The method 300 includes: forming 310 a selectively sealable evacuable storage bag, comprising: a first side comprising a flexible waterproof bag material having a first peripheral shape, a thickness, a first inner surface and a first outer surface; an opposed second side comprising the flexible waterproof bag material having a second peripheral shape that comprises a mirror image of the first peripheral shape, the thickness, a second inner surface, and a second outer surface, the first peripheral shape and first inner surface in corresponding engagement with the second peripheral shape and second inner surface; a waterproof weld joining a first peripheral portion of the first side to a second peripheral portion of the second side and defining an opening on an open end, a closed end, and a storage chamber extending between them, the opening configured to receive an article within the storage chamber; a selectively actuable valve sealably disposed on the first side or the second side, the selectively actuable valve disposed in a conduit that is sealably attached to the respective first side or second side and extends from a conduit opening in the respective first side or second side to an outlet opening; and a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve; disposing 320 the article within the storage chamber; closing 330 the selectively openable and closable seal; evacuating 340 the storage chamber to the evacuated condition; wherein the flexible waterproof bag material is configured to conform to the article in the evacuated condition, and wherein the flexible waterproof bag material is selected to provide selective operability of the article and a predetermined member of the article in the non-evacuated condition or the evacuated condition; and operating 350 the article within the storage chamber. In one embodiment of the method 300, the article comprises a firearm and the predetermined member comprises a trigger, a hammer, a safety, a decocker, an action, an ammunition clip, an ejector, or a combination thereof, and/or wherein the article comprises an electric device and the predetermined member comprises a touch screen, touch pad, keyboard, or selector switch, or a combination thereof, and operating comprises actuating the predetermined member.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of making a selectively sealable evacuable storage bag, comprising:
forming a first side comprising a flexible waterproof bag material comprising a thermoplastic polyurethane having a first peripheral shape, a thickness, a first inner surface and a first outer surface;
forming an opposed second side comprising the flexible waterproof bag material having a second peripheral shape that comprises a mirror image of the first peripheral shape, the thickness, a second inner surface, and a second outer surface, the first peripheral shape and first inner surface in corresponding engagement with the second peripheral shape and second inner surface;
forming a conduit opening in one of the first side or second side;
placing the first peripheral shape and first inner surface in corresponding engagement with the second peripheral shape and second inner surface;
welding the first side to the second side and forming a waterproof weld joining a first peripheral portion of the first side to a second peripheral portion of the second side and defining an opening on an open end, a closed end, and a storage chamber extending between them, the opening configured to receive an article within the storage chamber;
disposing a conduit over the conduit opening, the conduit comprises an L-shaped tube of a polyether thermoplastic polyurethane comprising a first leg and a second leg, an attachment flange disposed on a first end of the first leg that is configured for attachment by a circumferential weld proximate the conduit opening to the respective first side or second side, a selectively sealable cap attached by an attachment member to the second leg and configured to sealably cover the second leg at a second end, and a selectively actuable valve disposed in the conduit, and welding the attachment flange of the conduit sealably by the circumferential weld to the respective first side or second side, the conduit extending from the conduit opening in the respective first side or second side to an outlet opening; and
forming a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve, and wherein the flexible waterproof bag material is configured to conform to the article in the evacuated condition, and wherein the flexible waterproof bag material is selected to provide selective operability of the article and a predetermined member of the article in the evacuated condition.

2. The method of making a selectively sealable evacuable storage bag of claim 1, wherein the bag material comprises a polymer film or sheet.

3. The method of making a selectively sealable evacuable storage bag of claim 2, wherein the polymer film or sheet bag material has a thickness of 1 to 100 mils.

4. The method of making a selectively sealable evacuable storage bag of claim 1, wherein the selectively openable and closable seal comprises a flexible strap disposed on one of the first side or the second side, the strap having a first attachment device on one end and a second attachment device on an opposed end, the first attachment device and second attachment device configured for selectively locked and unlocked engagement, the closed condition comprising a plurality of rolls of the strap, first side, and second side toward the closed end and the subsequent locked engagement of the first attachment device and second attachment device.

5. The method of making a selectively sealable evacuable storage bag of claim 4, wherein the first attachment device comprises a male snap buckle and the second attachment device comprises a female snap buckle.

6. The method of making a selectively sealable evacuable storage bag of claim 1, wherein the selectively openable and closable seal comprises a zip top seal comprising a male portion disposed along and proximate the opening on one of the first side and second side and an interlockable female portion disposed along and proximate the opening on the other of the first side and second side.

7. The method of making a selectively sealable evacuable storage bag of claim 6, wherein the zip top seal is configured to provide the closed condition by manual compression of the male portion into the female portion or by zipped engagement provided by a zipper.

8. The method of making a selectively sealable evacuable storage bag of claim 1, wherein the article comprises a firearm and the predetermined member comprises a trigger, a hammer, a safety, a decocker, an action, an ammunition clip, an ejector, or a combination thereof, and/or wherein the article comprises an electric device and the predetermined member comprises a touch screen, touch pad, keyboard, or selector switch, or a combination thereof, and operating comprises actuating the predetermined member.

9. The method of making a selectively sealable evacuable storage bag of claim 8, wherein the firearm comprises a pistol, revolver, semi-automatic or fully-automatic rifle or gun, bolt action rifle, or shotgun.

10. The method of making a selectively sealable evacuable storage bag of claim 8, wherein the electronic device comprises a cell phone, satellite phone, tablet computer, laptop computer, or radio.

11. A method of using a selectively sealable evacuable storage bag, comprising:
forming a selectively sealable evacuable storage bag, comprising: a first side comprising a flexible waterproof bag material having a first peripheral shape, a thickness, a first inner surface and a first outer surface; an opposed second side comprising the flexible waterproof bag material having a second peripheral shape that comprises a mirror image of the first peripheral shape, the thickness, a second inner surface, and a second outer surface, the first peripheral shape and first inner surface in corresponding engagement with the second peripheral shape and second inner surface; a waterproof weld joining a first peripheral portion of the first side to a second peripheral portion of the second side and defining an opening on an open end, a closed end, and a storage chamber extending between them, the opening configured to receive an article within the storage chamber; a selectively actuable valve sealably disposed on the first side or the second side, the selectively actuable valve disposed in a conduit that is sealably attached to the respective first side or second side and extends from a conduit opening in the respective first side or second side to an outlet opening; and a selectively openable and closable seal disposed proximate the opening and configured to enable insertion and extraction of the article in an open condition and a watertight and airtight seal in a closed condition, wherein in the closed condition of the selectively openable and closable seal the storage chamber is evacuable from an unevacuated condition to an evacuated condition by selective removal of a gas through the selectively actuable valve;
disposing the article within the storage chamber,
closing the selectively openable and closable seal;
evacuating the storage chamber to the evacuated condition; wherein the flexible waterproof bag material is configured to conform to the article in the evacuated condition, and wherein the flexible waterproof bag material is selected to provide selective operability of the article and a predetermined member of the article in the non-evacuated condition or the evacuated condition; and
operating the article within the storage chamber.

12. The method of using the selectively sealable evacuable storage bag of claim 11, wherein the article comprises a firearm and the predetermined member comprises a trigger, a hammer, a safety, a decocker, an action, an ammunition clip, an ejector, or a combination thereof, and/or wherein the article comprises an electric device and the predetermined member comprises a touch screen, touch pad, keyboard, or selector switch, or a combination thereof, and operating comprises actuating the predetermined member.

13. The method of using the selectively sealable evacuable storage bag of claim 11, wherein the bag material comprises a polymer film or sheet.

14. The method of using the selectively sealable evacuable storage bag of claim 13, wherein the polymer film or sheet bag material has a thickness of 1 to 100 mils.

15. The method of using the selectively sealable evacuable storage bag of claim 11, wherein the selectively openable and closable seal comprises a flexible strap disposed on one of the first side or the second side, the strap having a first attachment device on one end and a second attachment device on an opposed end, the first attachment device and second attachment device configured for selectively locked and unlocked engagement, the closed condition comprising a plurality of rolls of the strap, first side, and second side toward the closed end and the subsequent locked engagement of the first attachment device and second attachment device.

16. The method of using the selectively sealable evacuable storage bag of claim 15, wherein the first attachment device comprises a male snap buckle and the second attachment device comprises a female snap buckle.

17. The method of using the selectively sealable evacuable storage bag of claim 11, wherein the selectively openable and closable seal comprises a zip top seal comprising a male portion disposed along and proximate the opening on one of the first side and second side and an interlockable female portion disposed along and proximate the opening on the other of the first side and second side.

18. The method of using the selectively sealable evacuable storage bag of claim 17, wherein the zip top seal is configured to provide the closed condition by manual compression of the male portion into the female portion or by zipped engagement provided by a zipper.

19. The method of using the selectively sealable evacuable storage bag of claim 12, wherein the firearm comprises a pistol, revolver, semi-automatic or fully-automatic rifle or gun, bolt action rifle, or shotgun.

20. The method of using the selectively sealable evacuable storage bag of claim 12, wherein the electronic device comprises a cell phone, satellite phone, tablet computer, laptop computer, or radio.

* * * * *